Nov. 5, 1929.                    J. W. BATE                    1,734,153
                        COMBINATION CHAIN AND LOCK
                            Filed Oct. 13, 1927
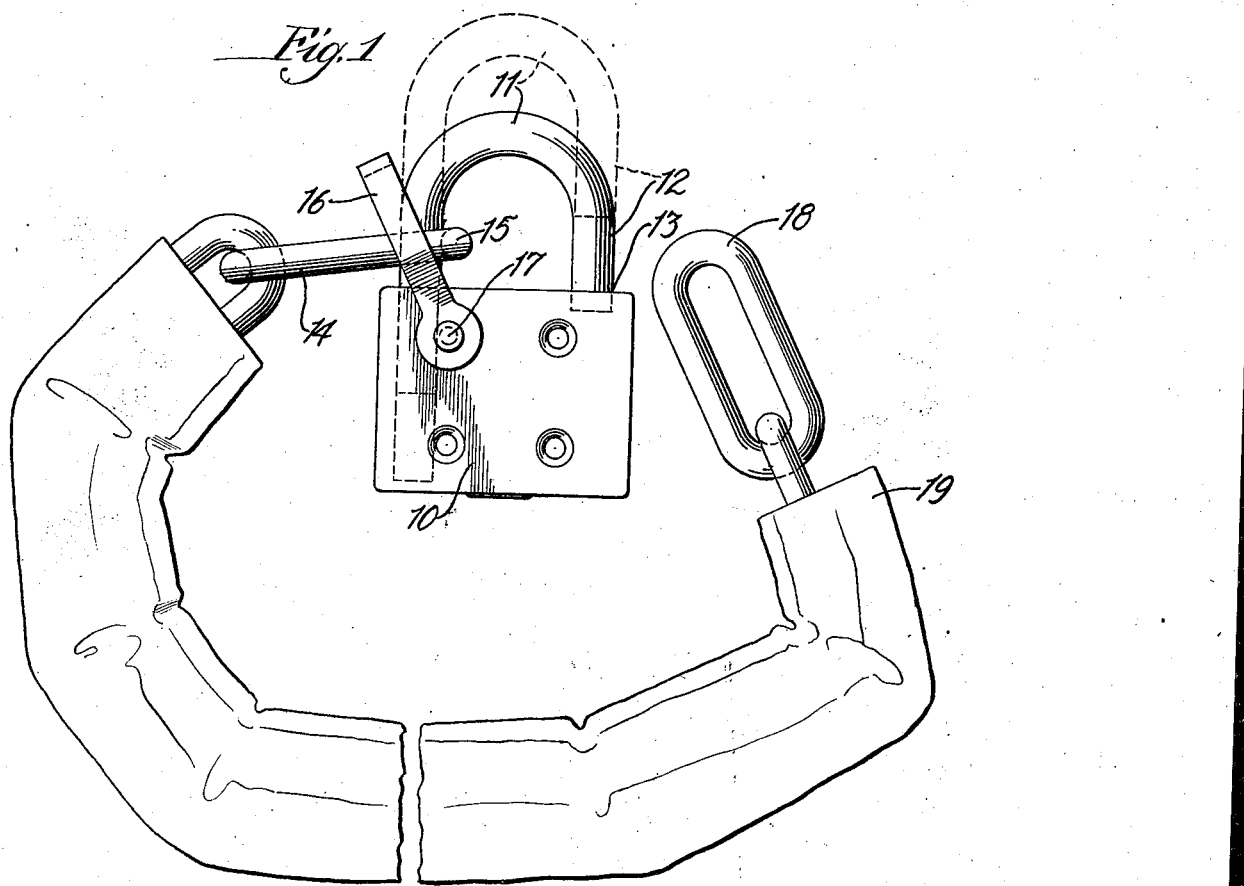
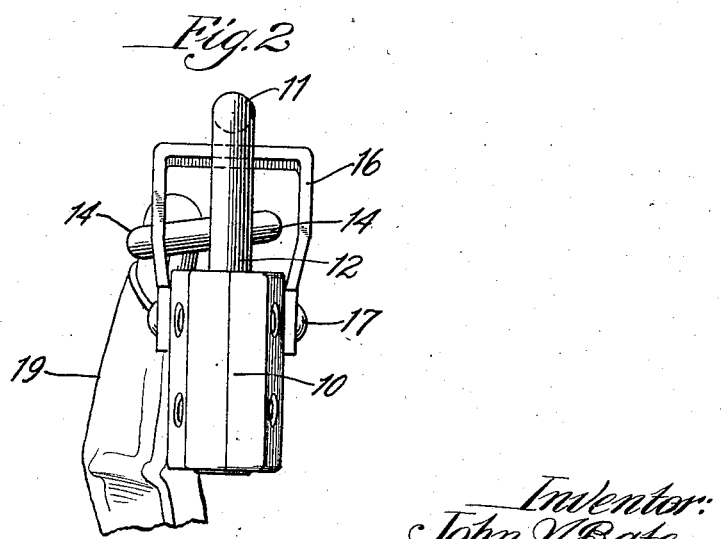
Inventor:
John W. Bate Patented Nov. 5, 1929

1,734,153

UNITED STATES PATENT OFFICE

JOHN W. BATE, OF RACINE, WISCONSIN

COMBINATION CHAIN AND LOCK

Application filed October 13, 1927. Serial No. 225,935.

This invention relates to a combination chain and lock and is particularly adapted to be used for locking spare tires on automobiles.

An object of the invention is to provide a combination of chain and lock wherein the lock is loosely but securely fastened to the chain so that the two cannot readily be separated either when locked or unlocked.

This and other objects, as will hereinafter appear, are fully described in the following specification and shown in the accompanying drawings in which—

Figure 1 is a front elevation of a chain and lock embodying the invention; and

Fig. 2 is a side elevation of the same.

The embodiment illustrated comprises a lock having a body 10 in which is slidably and rotatably fitted a U-shaped staple 11, the free end 12 of which enters an opening 13 in the body 12 when the lock is closed, as shown in full lines.

The chain 14, of a well known type having either straight or twisted links, has one end 15 passed over the staple 11 and is retained thereon by means of a U-shaped keeper 16 which is secured at its two ends to the sides of the body 10 by means of a rivet 17, or the like, preferably passing through the body of the lock.

With the parts proportioned as here shown, the link 14 cannot be removed from the staple 11 in any position in which the elements can be placed, particularly as this link is too short to be passed over the open end of the staple. Likewise, the U-shaped keeper 16 is unable to swing over the staple even when closed.

When used as the protector for spare tires and the like, the chain is passed around the spare tire and the end of the link 18 passed under the end 12 of the staple after which it is pressed in until it assumes the full line position of Figure 1 in which position it is locked.

It will thus be seen that a very simple and efficient form of keeper is provided which allows the maximum of movement between the lock and the chain and at the same time prevents the lock and chain from being separated from each other. The cover 19 of leather, rubber, or the like, is provided for the chain to prevent it from wearing the parts of the automobile with which it comes in contact.

While I have shown and described but a single embodiment of my invention, it is to be understood that it is capable of many modifications. Changes, therefore, in the construction and arrangement may be made which do not depart from the spirit or scope of the invention as defined by the appended claim.

What I claim as new and desire to secure by Letters Patent is:

A lock comprising a body, a sliding and rotary U-shaped shackle having a long and a short leg, and a chain, a chain retaining member pivoted to the body near its shackle receiving edge and adjacent the longer leg of said shackle, said chain engaging the longer leg of said shackle and being embraced by said chain retaining member, whereby said retaining member prevents separation of the lock and chain without preventing free movement of the chain relative to the shackle.

JOHN W. BATE.